US008111906B2

(12) United States Patent
Song et al.

(10) Patent No.: US 8,111,906 B2
(45) Date of Patent: Feb. 7, 2012

(54) STEREOSCOPIC IMAGE DISPLAY DEVICE

(75) Inventors: Myoung-Seop Song, Suwon-si (KR);
Jang-Doo Lee, Suwon-si (KR);
Hyoung-Wook Jang, Suwon-si (KR);
Woo-Jong Lee, Suwon-si (KR);
Hyun-Sook Kim, Suwon-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 1312 days.

(21) Appl. No.: 11/480,017

(22) Filed: Jun. 29, 2006

(65) Prior Publication Data
US 2007/0003134 A1 Jan. 4, 2007

(30) Foreign Application Priority Data

Jun. 30, 2005 (KR) .................. 10-2005-0057788

(51) Int. Cl.
G06K 9/00 (2006.01)
G06K 9/36 (2006.01)
H04N 13/04 (2006.01)
G06T 15/00 (2006.01)
(52) U.S. Cl. .......... 382/154; 382/285; 348/51; 345/419
(58) Field of Classification Search .................. None
See application file for complete search history.

(56) References Cited

U.S. PATENT DOCUMENTS

| | | | | |
|---|---|---|---|---|
| 4,875,034 A * | 10/1989 | Brokenshire | ................. | 715/848 |
| 5,640,171 A * | 6/1997 | Shimada | ................. | 345/8 |
| 5,742,332 A * | 4/1998 | Imai et al. | ................ | 348/51 |
| 6,023,277 A | 2/2000 | Osaka et al. | | |
| 6,094,216 A * | 7/2000 | Taniguchi et al. | ................ | 348/51 |
| 6,169,516 B1 * | 1/2001 | Watanabe et al. | ........ | 342/357.51 |
| 6,175,379 B1 * | 1/2001 | Uomori et al. | .................. | 348/47 |
| 6,198,484 B1 * | 3/2001 | Kameyama | ................ | 345/419 |
| 6,225,979 B1 * | 5/2001 | Taima et al. | ................. | 345/157 |
| 6,496,218 B2 * | 12/2002 | Takigawa et al. | ................. | 348/42 |
| 6,677,939 B2 * | 1/2004 | Uchiyama | ................. | 345/419 |
| 6,721,444 B1 * | 4/2004 | Gu et al. | ................ | 382/154 |
| 6,771,231 B2 * | 8/2004 | Ishikawa | ................ | 345/9 |

(Continued)

FOREIGN PATENT DOCUMENTS

CN 1496177 A 5/2004

(Continued)

OTHER PUBLICATIONS

Patent Abstracts of Japan, Publication No. 07-114451, dated May 2, 1995, in the name of Sukeyuki Tanaka, et al.

(Continued)

*Primary Examiner* — Vikkram Bali
*Assistant Examiner* — Michelle Entezari
(74) *Attorney, Agent, or Firm* — Christie, Parker & Hale, LLP

(57) ABSTRACT

A stereoscopic image display device is provided. The stereoscopic image display device includes a display unit including a plurality of pixels arranged in a matrix, the respective pixels including right/left-eye pixels arranged in a row direction, an area detector for detecting first data respectively corresponding to at least a part of the pixels from a plurality of input data, a data converter for converting the first data to the right/left-eye data corresponding to the right/left-eye pixels, a data combiner for combining stereoscopic image data by arranging the right/left-eye data, and a data driver for applying a data signal corresponding to the stereoscopic image data to the display unit.

32 Claims, 12 Drawing Sheets

U.S. PATENT DOCUMENTS

| | | | |
|---|---|---|---|
| 6,906,686 B2 * | 6/2005 | Ishikawa | 345/1.1 |
| 7,088,364 B2 * | 8/2006 | Lantin | 345/427 |
| 7,557,824 B2 * | 7/2009 | Holliman | 348/46 |
| 7,656,403 B2 * | 2/2010 | Grover et al. | 345/423 |
| 7,825,948 B2 * | 11/2010 | Van Geest et al. | 348/51 |
| 7,983,477 B2 * | 7/2011 | Holliman | 382/154 |
| 2003/0142068 A1 * | 7/2003 | DeLuca et al. | 345/156 |
| 2004/0027267 A1 * | 2/2004 | Rousso | 342/1 |
| 2004/0179729 A1 * | 9/2004 | Imai et al. | 382/154 |
| 2004/0223051 A1 * | 11/2004 | Peleg et al. | 348/53 |
| 2004/0239763 A1 * | 12/2004 | Notea et al. | 348/169 |
| 2005/0041736 A1 * | 2/2005 | Butler-Smith et al. | 375/240.01 |
| 2005/0062905 A1 | 3/2005 | Kim et al. | |
| 2005/0088516 A1 * | 4/2005 | Song et al. | 348/51 |
| 2008/0192152 A1 * | 8/2008 | Facius et al. | 348/750 |

FOREIGN PATENT DOCUMENTS

| | | |
|---|---|---|
| EP | 1 098 498 A1 | 5/2001 |
| EP | 1 235 438 A1 | 8/2001 |
| EP | 1 357 726 A1 | 10/2003 |
| EP | 1 403 759 A2 | 3/2004 |
| EP | 1 406 456 A2 | 4/2004 |
| EP | 1 549 084 A1 | 6/2005 |
| EP | 1 406 456 A3 | 1/2006 |
| JP | 5-284542 | 10/1993 |
| JP | 7 114451 | 5/1995 |
| JP | 10-224825 | 8/1998 |
| JP | 11-289555 | 10/1999 |
| JP | 2000-078611 | 3/2000 |
| JP | 2001-251403 | 9/2001 |
| JP | 2004-112175 | 4/2004 |
| JP | 2005-049668 | 2/2005 |
| JP | 2005-175566 | 6/2005 |
| WO | WO 2004/099965 A1 | 11/2004 |

OTHER PUBLICATIONS

Patent Abstracts of Japan, Publication No. 2001-251403, dated Sep. 14, 2001, in the name of Ichiro Ogawa, et al.

European Search Report dated Aug. 25, 2006, for EP 06116371.3, in the name of Samsung SDI Co, Ltd.

Patent Abstracts of Japan, Publication No. 05-284542; Date of Publication: Oct. 29, 1993; in the name of Kenji Nakazawa et al.

Patent Abstracts of Japan, Publication No. 2004-112175; Date of Publication: Apr. 8, 2004; in the name of Keiji Taniguchi et al.

Patent Abstracts of Japan, Publication No. 2005-175566; Date of Publication: Jun. 30, 2005; in the name of Shinichi Hirabayashi.

* cited by examiner

STEREOSCOPIC IMAGE DISPLAY DEVICE

CROSS-REFERENCE TO RELATED APPLICATION

This application claims priority to and the benefit of Korean Patent Application No. 10-2005-0057788, filed in the Korean Intellectual Property Office on Jun. 30, 2005, the entire content of which is incorporated herein by reference.

BACKGROUND OF THE INVENTION

1. Field of the Invention

The present invention relates to a stereoscopic image display device, and, more particularly, to a stereoscopic image display device for realizing a user interface including a stereoscopic image.

2. Description of the Related Art

Generally, a stereoscopic image display device provides different right/left-eye images to a user without any additional device, such as polarizing spectacles, so that a user perceives a sense of distance and a 3D (or stereoscopic) effect.

By providing a parallax barrier, a lenticular lens, or microlens array on a front of a display panel, the stereoscopic image display device uses a space division method in which left eye and right eye images displayed on the display panel are respectively divided in a left eye direction and a right eye direction.

The stereoscopic image display device is operated by a user interface. The user interface provides set-up/control mechanisms for the user. Also, the user interface displays the results thereof when the user sets up and controls the corresponding device. Therefore, when the user selects an item from a menu in the user interface, the selected item should be displayed differently from other items.

The above information disclosed in this Background section is only for enhancement of understanding of the background of the invention and therefore it may contain information that does not form the prior art that is already known in this country to a person of ordinary skill in the art.

SUMMARY OF THE INVENTION

An aspect of the present invention provides a stereoscopic image display device having a user interface that includes a stereoscopic image.

Particularly, an aspect of the present invention provides a stereoscopic image display device capable of expressing at least a part of a user interface in a stereoscopic image by converting at least a part of the input data to stereoscopic image data so as to realize the user interface.

An exemplary stereoscopic image display device according to an embodiment of the present invention includes a display unit including a plurality of pixels arranged in a matrix with the respective pixels including right/left-eye pixels arranged in a row direction, an area detector for detecting first data respectively corresponding to at least a part of the pixels among a plurality of input data, a data converter for converting the first plurality of data to the right/left-eye data corresponding to the right/left-eye pixels, a data combiner for generating stereoscopic image data by arranging the right/left-eye data, and a data driver for applying a data signal corresponding to the stereoscopic image data to the display unit.

In a further embodiment, a stereoscopic image display device includes a display unit including a plurality of pixels arranged in a matrix with the respective pixels including right/left-eye pixels arranged in a row direction, a depth information extractor for extracting depth information from input data using 3D spatial information included in the input data, a data converter for converting the input data to the right/left-eye data respectively corresponding to the right/left-eye pixels using the depth information, a data combiner for combining stereoscopic image data by arranging the right/left-eye data, and a data driver for applying a data signal corresponding to the stereoscopic image data to the display unit.

In a further embodiment, a stereoscopic image display device includes a display unit including a plurality of pixels arranged in a matrix with the respective pixels including right/left-eye pixels arranged in a row direction, an area detector for detecting first data respectively corresponding to at least a part of the pixels among a plurality of input data, a first data converter for converting the first data to the right/left-eye data respectively corresponding to the right/left-eye pixels when the first data is 2D image data, a second data converter for converting the first data to the right/left-eye data respectively corresponding to the right/left-eye pixels using depth information when the first data is 3D image data and the depth information is extracted with respect to the respective first data using 3D spatial information included in the first data, a stereoscopic image combiner for combining stereoscopic image data by arranging the right/left-eye data generated from the first data converter or the second data converter, and a data driver for applying a data signal corresponding to the stereoscopic image data to the display unit.

DETAILED DESCRIPTION

Figure 1:
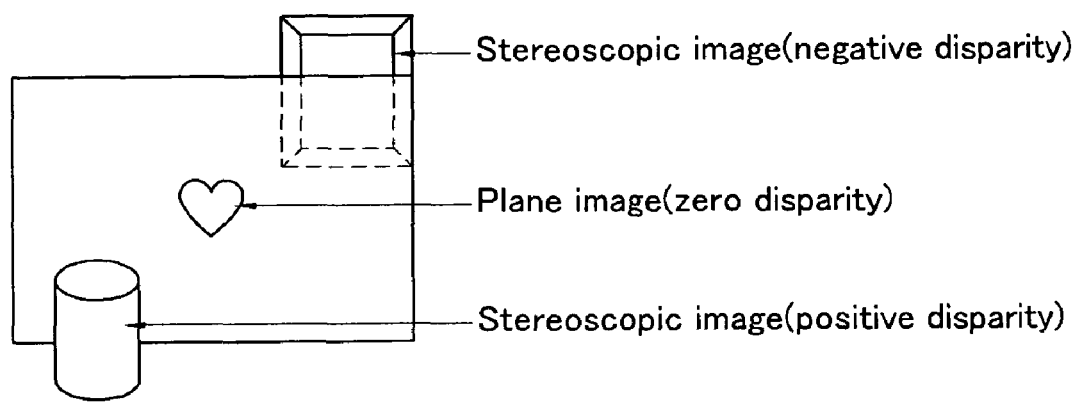
FIG. 1 is a schematic view of a stereoscopic image perceived by a user according to a disparity.

Embodiments of the present invention will hereinafter be described in more detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

First, principles for displaying a stereoscopic image will be schematically described before a stereoscopic image display device is described according to an exemplary embodiment of the present invention.

Generally, since an observer views a 3D (or stereoscopic) object at somewhat different positions with right and left eyes, the observer perceives different image information through these two eyes. The observer combines the different image information to obtain depth information for the 3D object and to perceive a 3D (or stereoscopic) effect.

The stereoscopic image display device enables the observer to see a stereoscopic image of an object by providing images to be respectively viewed by the right and left eyes of the observer.

Here, a disparity of the two eyes is generated between the two images to be viewed by the left and right eyes. When the disparity is given as a positive value, the observer perceives that the stereoscopic object is placed at a closer position than a predetermined reference. When the disparity is given as a negative value, the observer perceives that the stereoscopic object is placed at a farther position than a predetermined reference.

FIG. 1 is a schematic view of a stereoscopic image perceived by a user according to a disparity. As shown in FIG. 1, the observer perceives that a cylindrical image of a positive disparity is placed at a closer position than a predetermined reference, and a rectangular image having a negative disparity is placed at a farther position than the predetermined reference. The observer perceives that a heart image of a zero disparity is placed at the predetermined reference surface. In this embodiment, a "stereoscopic image" can refer to an image that the observer perceives to be at a closer position or a farther position than a predetermined reference of a display unit of a display device. On the other hand, a "plane image" can refer to an image that the observer perceives to be at the predetermined reference surface. In addition, a "stereoscopic image display device" can refer to a display device capable of displaying the above-described stereoscopic images.

In this embodiment, the stereoscopic image display device employs a parallax barrier method that separates the right/left-eye images using a parallax barrier to obtain a 3D effect. However, it should be understood that the parallax barrier method is only an example, and embodiments of the present invention may be applied to a stereoscopic image display device employing a lenticular method using a lenticular lens.

In addition, the stereoscopic image display device is formed as a liquid crystal display device. However, it should be understood that the liquid crystal display device is only an example, and embodiments of the present invention may be applied to other displays such as an OLED display device, a plasma display device, and/or a field emission display device.

Figure 2:
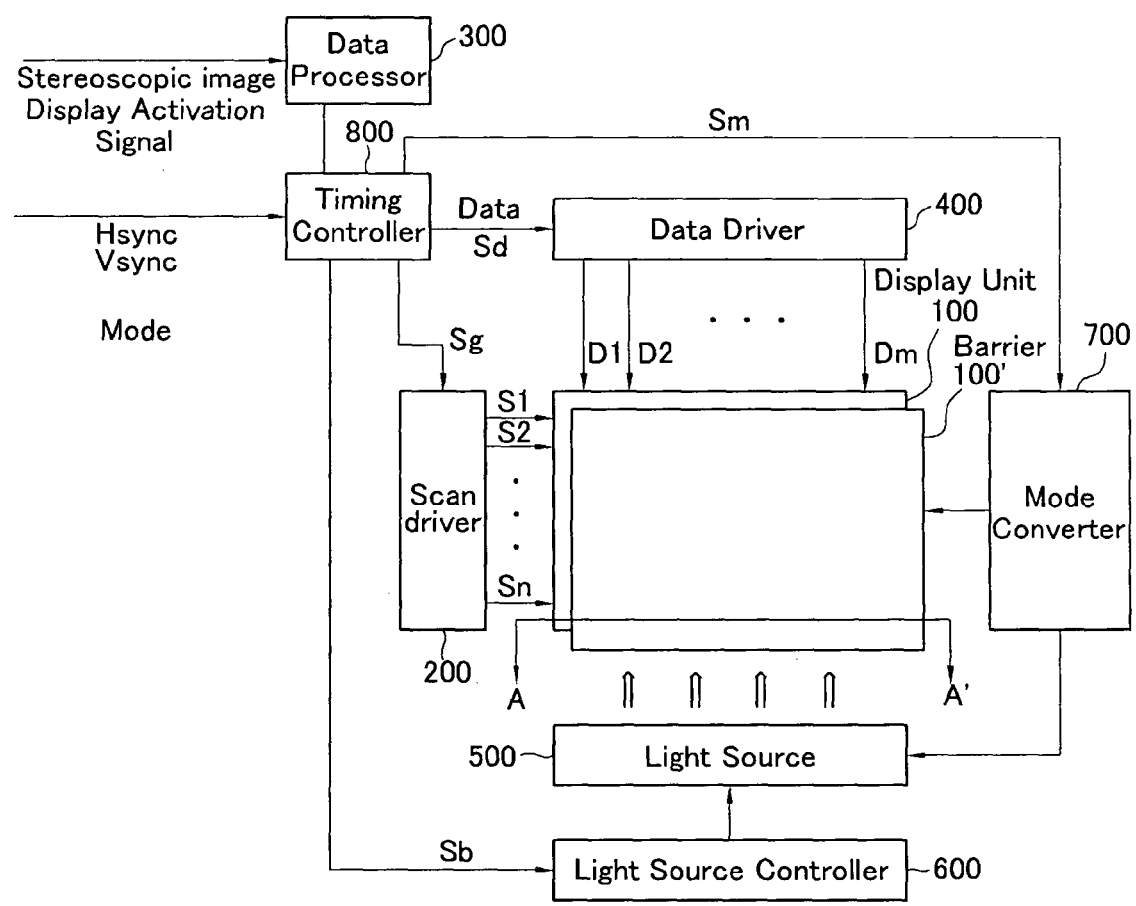
FIG. 2 is a schematic view of a stereoscopic image display device according to an exemplary embodiment of the present invention.

FIG. 2 is a schematic diagram of a stereoscopic image display device according to an exemplary embodiment of the present invention.

As shown in FIG. 2, a stereoscopic image display device includes a display unit 100, a barrier 100', a scan driver 200, a data processor 300, a data driver 400, a light source 500, a light source controller 600, a mode converter 700, and a timing controller 800. The light source 500 is formed as a surface light source and may be provided at a rear of the display unit 100. However, the light source 500 is illustrated as being below the display unit 100 in FIG. 2 for better understanding and ease of description of the present embodiment.

The display unit 100 includes a plurality of scan lines S1 to Sn for transmitting selection signals, a plurality of data lines D1 to Dm for transmitting data signals and formed crossing but insulated from the plurality of scan lines S1 to Sn, and a plurality of subpixels (not shown) at areas defined by the crossings of the plurality of scan lines and the plurality of data lines.

In addition, the plurality of pixels of the display unit 100 includes right-eye pixels forming right-eye images to be viewed by the right eye and left-eye pixels forming left-eye images to be viewed by the left eye.

The barrier 100' is provided at one surface of the display unit 100 and includes opaque regions (not shown) and transparent regions (not shown) formed according to the arrangement of the right/left-eye pixels. Using the opaque regions and the transparent regions, the barrier 100' separates the right/left-eye images respectively transmitted from the right/left-eye pixels to a left-eye direction and a right eye direction. The opaque regions and the transparent regions may be arranged in the form of a stripe or a zigzag pattern according to the arrangement of the left-eye-pixels and right-eye pixels.

In this embodiment, the barrier 100' includes a pair of electrodes applied with voltages of different levels and a liquid crystal cell formed therebetween. By applying voltages to the electrodes in response to a mode signal Sm input from the timing controller 800, the barrier 100' converts the liquid crystal cell to be transparent or to be opaque by changing arrangement of liquid crystals.

Also, in order to display plane images at the display unit 100, the barrier 100' of the stereoscopic image display device controls the opaque regions to become transparent. In this case, the data driver 400 applies a data signal without separating the right/left-eye data, and the pixels of the display unit 100 display images according to the data signal without differentiating the right/left-eye pixels. In order to display the stereoscopic image at the display unit 100, the barrier 100' controls the opaque regions to become opaque. In this case, the data driver 400 appropriately applies a data signal including the right/left-eye data to the left-eye pixel and the right-eye pixel to provide a stereoscopic image to the observer.

Figure 3:
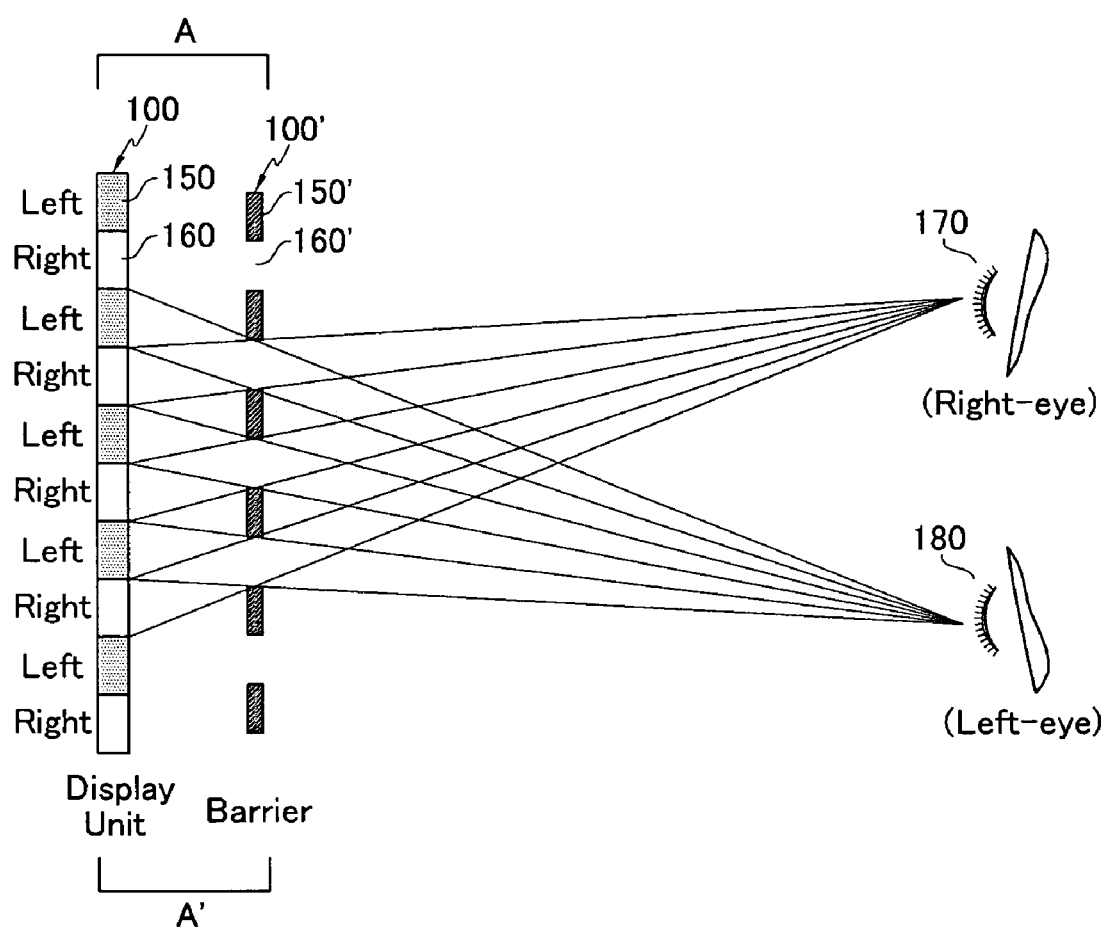
FIG. 3 illustrates a principle in which a stereoscopic image display device of FIG. 2 displays a stereoscopic image.

Hereinafter, how an observer can perceive a stereoscopic image through the display unit 100 and the barrier 100' of FIG. 2 will be schematically described with reference to FIG. 3. FIG. 3 is a cross-sectional view of the display unit 100 and the barrier 100' along the line A-A' of FIG. 2 for showing how the observer perceives a stereoscopic image through the right/left-eye pixels.

As shown in FIG. 3, the display unit 100 includes a plurality of left-eye pixels 150 and a plurality of right-eye pixels 160 alternately arranged, and the barrier 100' includes a plurality of opaque regions 150' and transparent regions 160' alternately arranged in the same direction as that of the arrangement of the plurality of left-eye pixels 150 and right-eye pixels 160. The left-eye pixels 150 transmit the left-eye images through the transparent region 160' to the left eye 180, and the right-eye pixels 160 transmit the right-eye images through the transparent region 160' to the right eye 170. The opaque regions 150' form an optical path such that the right/left-eye pixels 160 respectively transmit images through the transparent regions 160' to the right/left eyes.

The observer views images to be displayed on the display unit 100 through the transparent regions 160' of the barrier 100'. In this case, the different regions of the display unit 100 are respectively viewed by the right eye 170 and left eye 180 through the same transparent region 160'. That is, the images displayed on the adjacent left-eye pixel 150 and right-eye pixel 160 are respectively viewed by the left eye 180 and right eye 170 through the same transparent region 160'.

The left-eye image to be displayed on the left-eye pixel 150 has a first disparity with respect to the right eye image displayed on the right-eye pixel 160, and the right-eye image has a second disparity with respect to the left-eye image, wherein the first and second disparities may been predetermined. Therefore, when the observer views the right/left-eye images respectively transmitted from the left-eye and right-eye pixels 150 and 160 with right and left eyes, the observer obtains depth information for perceiving a stereoscopic effect and thus perceives the images as if an actual stereoscopic object is being viewed by the right and left eyes.

Referring also to FIG. 2, the light source controller 600 controls the lighting time of the light emitting diodes in response to a control signal Sb output from the timing controller 800. In this case, a period when the data driver 400 applies the data signal to the data lines D1 to Dm and a period when the light source 600 lights the red (R), green (G), and blue (B) light emitting diodes can be synchronized with each other by the control signals supplied by the timing controller 800.

The mode converter 700 controls the barrier 100' such that the liquid crystal arrangements become transparent or opaque in response to the mode signal Sm input from the timing controller 800.

In response received signals, e.g., a horizontal synchronization signal Hsync and a vertical synchronization signal Vsync received externally or from a graphic controller (not shown), the timing controller 800 respectively supplies the required control signals Sg, Sd, and Sb, and the mode signal Sm to the scan driver 200, the data processor 300, and the mode converter 700.

In this case, the data received at the timing controller 800 may be plane image data, stereoscopic image data, or combined data in which the plane image data and the stereoscopic image data is partially combined.

The scan driver 200 sequentially generates a selection signal in response to the control signal (Sg) output from the timing controller 800, and applies them to the scan lines S1 to Sn.

The data driver 400 converts data input from the timing controller 800 to a data signal and applies the data signal to the data lines D1 to Dm in response to the control signal Sd input from the timing controller 800.

In FIG. 2, it is exemplarily shown that the timing controller 800 controls the data driver 400; however, it should be understood that the present invention is not limited thereto.

In response to a stereoscopic image display activation signal, the data processor 300 transmits the input data to the timing controller 800, converts at least a part of the input data to the right/left-eye data to combine stereoscopic image data and transmits the combined stereoscopic image data to the timing controller 800. The timing controller 800 transmits the input data to the data driver 400. In FIG. 2, it is exemplarily shown that the data processor 300 is formed in front of the timing controller 800. However, it should be understood that the location of the data processor 300 is not limited thereto.

Figure 4:
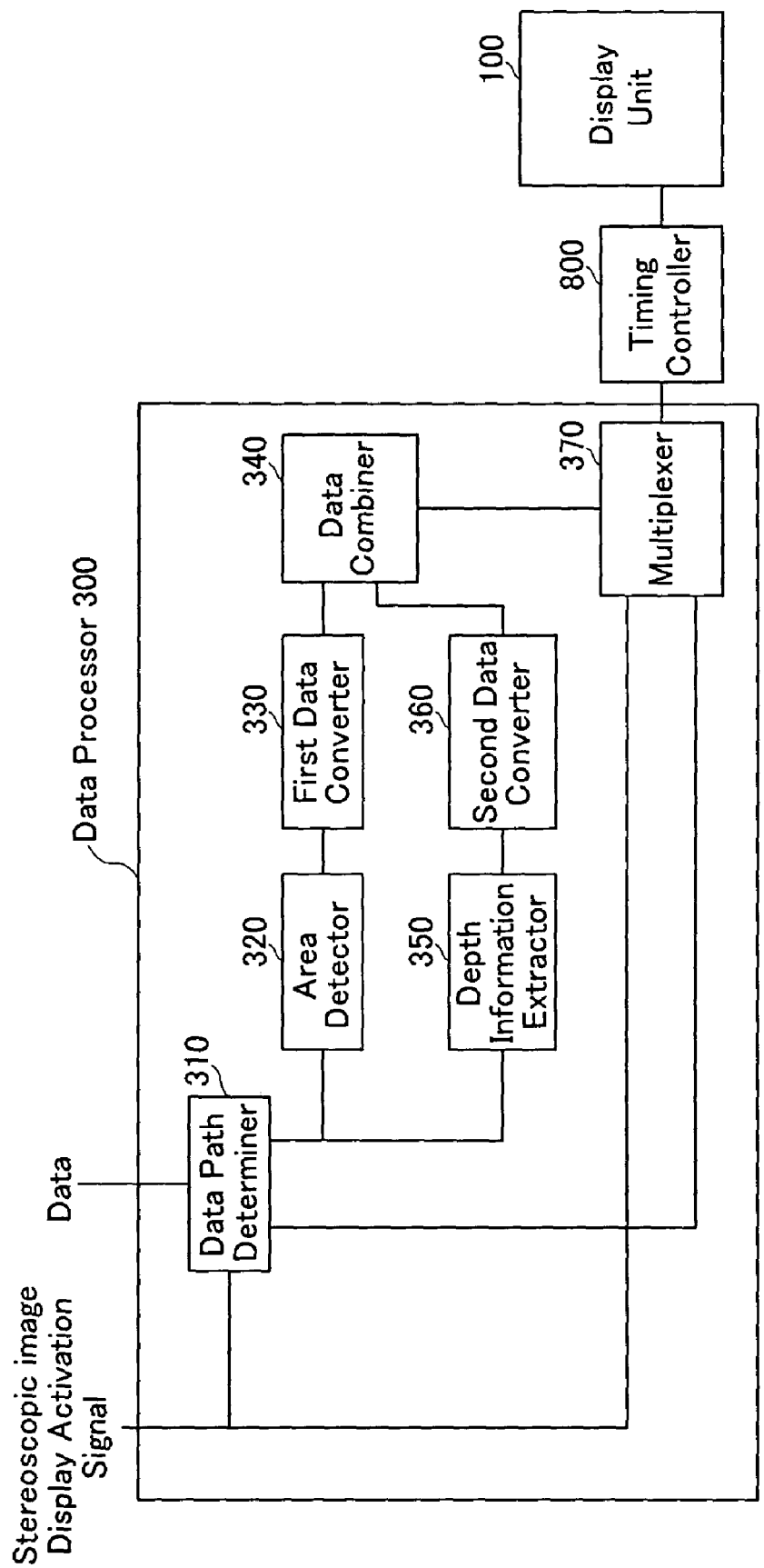
FIG. 4 illustrates a configuration of a data processor according to an exemplary embodiment of the present invention.

The data processor 300 according to an exemplary embodiment of the present invention is described in more detail with reference to FIG. 4. FIG. 4 illustrates a configuration of the data processor 300 according to the exemplary embodiment of the present invention.

As shown in FIG. 4, the data processor 300 includes a data path determiner 310, an area detector 320, a first data converter 330, a data combiner 340, a depth information extractor 350, a second data converter 360, and a multiplexer 370.

In response to the stereoscopic display activation signal, the data path determiner 310 determines a data processing path and whether the input data will be converted to stereoscopic image data. The stereoscopic display activation signal determines whether at least a part of the input data will be converted to stereoscopic image data. The part of the input data may include data corresponding to an area that includes the position at which the user places a predetermined pointing mechanism in the user interface.

The stereoscopic display activation signal may be directly applied through the user interface, or may be generated when the stereoscopic display device satisfies a predetermined condition.

When the stereoscopic image display device is a mobile communication terminal, the predetermined condition may include receiving a phone call or a short message service (SMS). In this case, the stereoscopic display device generates the stereoscopic display activation signal on receiving the phone call or the SMS and sends the generated activation signal to the data path determiner 310. In addition, in response to the stereoscopic display activation signal, the data path determiner 310 provides a predetermined stereoscopic image corresponding to the user receiving the phone call or the SMS.

In addition, the data path determiner 310 analyzes the type of the input data and determines a data processing path appropriate for the type so as to convert at least a part of the input data to stereoscopic image data. Types of input data include 2D image data, 3D image data, or stereoscopic image data. The type of the input data may be determined based on spatial information included in the input data. In more detail, when the input data include X, Y, and Z coordinate information, it is determined as 3D image data, and when the data is separated into right/left-eye data, it is determined as stereoscopic image data.

For 2D image data, the data path determiner 310 transmits the data through a first data processing path that passes through the area detector 320, the first data converter 330, and the data combiner 340. For 3D image data, the data path determiner 310 transmits the data through a second data processing path that passes through the depth information extractor 350, the second data converter 360, and the data combiner 340. When the data is stereoscopic image data, the data path determiner 310 directly transmits the data to the multiplexer 370.

The components associated with the 2D image data processing path will be described in more detail below.

The area detector 320 detects data to be expressed in a stereoscopic image among the input data, and transmits the detected data to the first data converter 330. In more detail, among the entire data respectively corresponding to the entire pixels arranged in the display unit 100, the area detector 320 detects the data corresponding to at least a part of the pixel area (hereinafter, called 'stereoscopic image display area') to be expressed in a stereoscopic image. The entire data may form a user interface.

The user interface includes one or more menu icons, which respectively correspond to the functions provided to the user. When the user selects a specific menu icon in the user interface, the area detector 320 detects data corresponding to the selected menu icon. The menu icon is selected through a predetermined controlling mechanism (e.g., a remote control, key pad, etc.) for controlling the stereoscopic image display device. That is, the menu icons are sequentially selected according to a control of the controlling mechanism (e.g., a control of a direction key) in the user interface, and the area detector 320 sequentially detects the data corresponding to the stereoscopic image.

Also, when the user directly selects the specific menu icon from the user interface through a touch pad, a touch screen, etc., the area detector 320 obtains selected position information (e.g., X and Y coordinate information) by sampling the positions which the user selects in the display unit 100 and detects the data corresponding to the menu icon including the corresponding position information.

The first data converter 330 converts the data corresponding to stereoscopic image display data to right/left-eye data.

In this embodiment, the first data converter 330 converts the input data to the right/left-eye data by shifting it by a distance in the right or left direction, wherein the distance may have been predetermined. According to an exemplary embodiment of the present invention, it is assumed that, in the area not to be expressed in a stereoscopic image, the same data is input for the right/left-eye pixels. In this case, the first data converter 330 left-shifts the data by a first number of pixels to form the left-eye data, and it right-shifts the data by a second number of pixels to form the right-eye data, wherein the first and second numbers may have been predetermined.

The number of the pixels by which the first data converter 330 shifts data in the right/left direction may be set different depending on the size of the selected menu icon, the stereoscopic image display method (e.g., a parallax barrier method or a lenticular method), the aperture ratio in the case of the parallax barrier method, and the size of the display unit 100.

Hereinafter, a 3D image data processing path will be described in more detail.

The depth information extractor 350 extracts the depth information included in the input 3D image data, and transmits the extracted depth information to the second data converter 360.

The 3D image data includes the spatial information (e.g., X, Y, and Z coordinates) for the respective data so as to express the data in a 3D image. The depth information extractor 350 extracts the depth information for the data by using the spatial information of the data. In more detail, the depth information extractor 350 may extract the depth information in correspondence with the Z coordinate among the space coordinates. The depth information may be extracted from the Z coordinates by defining the maximum values of the depth information in the positive and negative directions to be 10 and 0.

The stereoscopic image data may form a user interface including a predetermined menu icon, a background, etc. In this case, the depth information extractor 350 extracts the respective depth information for the respective menu icon and the background, and transmits the respective depth information to the second data converter 360.

Although not shown in the 3D image data processing path of FIG. 4, the 3D image data processing path according to an embodiment of the present invention may also include an area detector. In one embodiment, this area detector is the same area detector 320 as associated in the 2D image data processing path. In this case, the depth information extractor 350 may add depth information (e.g., predetermined depth information or 2) to the detected data. For example, when the original depth information is given as 7 for the detected data, the final depth information may be given as 7+2=9.

The second data converter 360 receives the depth information for the 3D image data from the depth information extractor 350, and extracts the right/left-eye data corresponding to the 3D image data using the received depth information. The method for generating the right/left-eye data using the corresponding depth information for the input data has already been described in detail in connection with the 2D image data processing path. Accordingly, such a method will not described in detail again.

The data combiner 340 combines the stereoscopic image data by receiving the right/left-eye data from the first data converter 330 or the second data converter 360 and by arranging the right/left-eye data such that the right/left-eye data may respectively be applied to the right/left-eye pixels of the display unit 100. In this case, the data combiner 340 arranges the right/left-eye data in correspondence with the arrangement of the right/left-eye pixels.

The data combiner 340 may arrange the right/left-eye data differently depending on the arrangement of the right/left-eye pixels. In addition, some data may not be converted to the right/left-eye data because they are not detected by the area detector 320. In order to combine the stereoscopic image data, the data combiner 340 may arrange such non-converted data together with the right/left-eye data such that they correspond to the pixels of the data display unit 100.

The multiplexer 370 receives the combined stereoscopic image data, and transmits the stereoscopic image data to the data driver 400 in response to the stereoscopic display activation signal.

When the stereoscopic image user interface is not to be used, the user will not apply the stereoscopic display activation signal. In this case, the multiplexer 370 directly receives the data and transmits the received data to the data driver 400. However, when the stereoscopic image user interface is to be used, the user will apply the stereoscopic display activation signal. As a result, at least a part of the data is converted to right/left-eye data through the 2D image data or 3D image data processing path so as to combine the stereoscopic image data. The multiplexer 370 receives the stereoscopic image data, and in response to the stereoscopic display activation signal, transmits them through the timing controller 800 to the data driver 400.

The data driver 400 receives input data or the stereoscopic image data, converts the input data or the stereoscopic image data to data signals in the form of analog data voltages corresponding thereto, and applies the data signals to the data lines of the display unit 100. The data driver 400 may include a digital/analog converter, a level shifter, a resistance ladder, etc., such that the input data or stereoscopic image data may be converted from the digital signal to the analog signal.

Figure 5A:
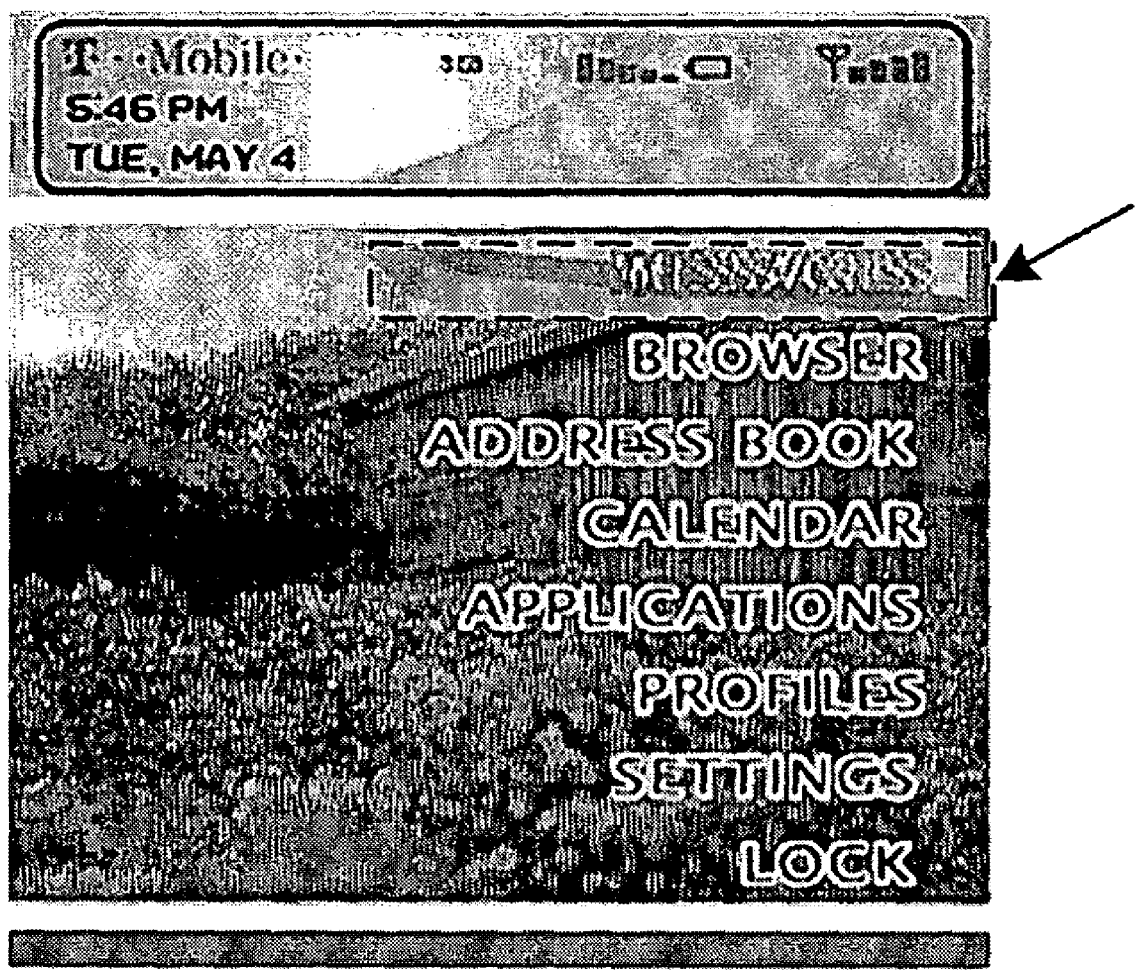
FIG. 5A illustrates a stereoscopic-image user interface on which a stereoscopic image display device stereoscopically displays a selected item in a menu according to an exemplary embodiment of the present invention.
Figure 5B:
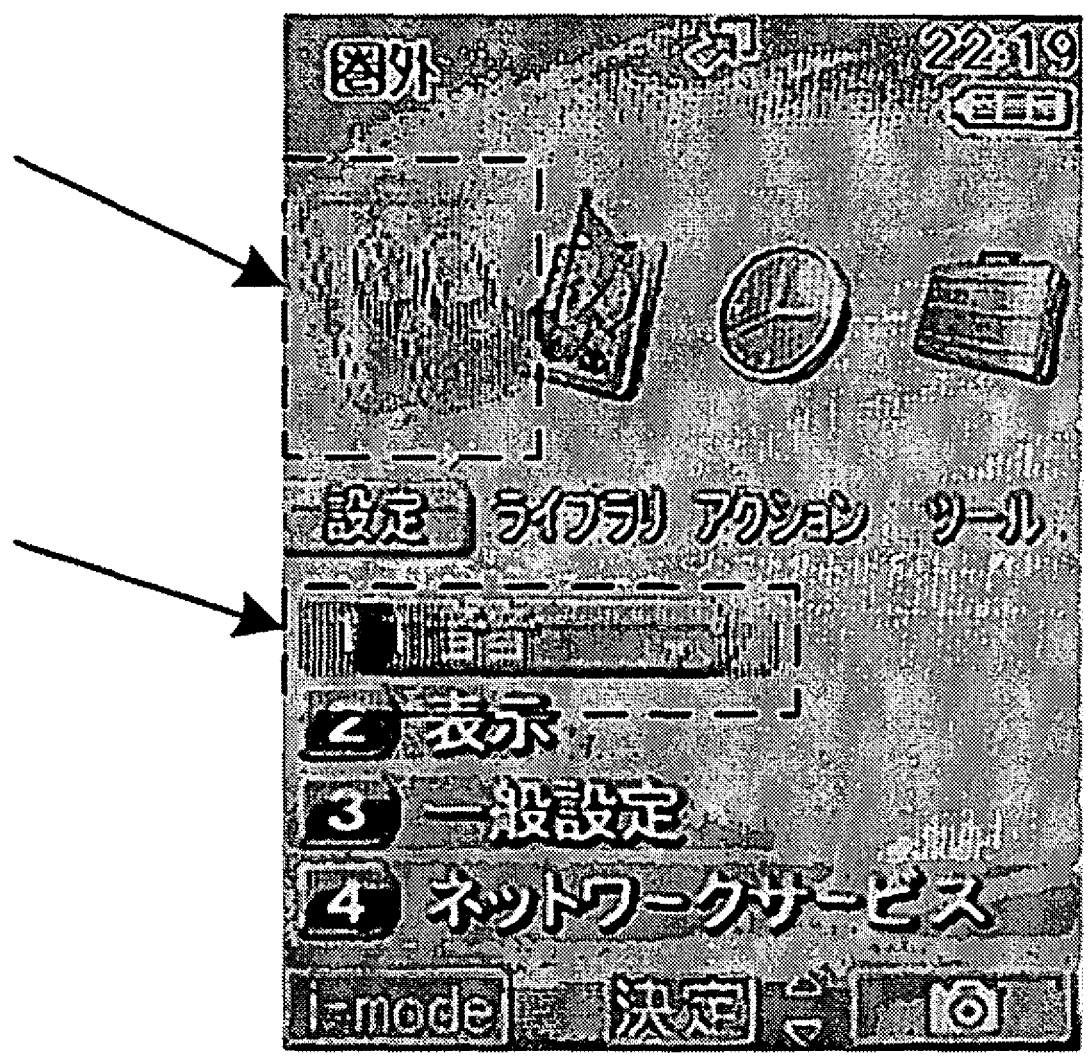
FIG. 5B illustrates a stereoscopic-image user interface on which a stereoscopic image display device stereoscopically displays selected icon and text items according to an exemplary embodiment of the present invention.
Figure 5C:
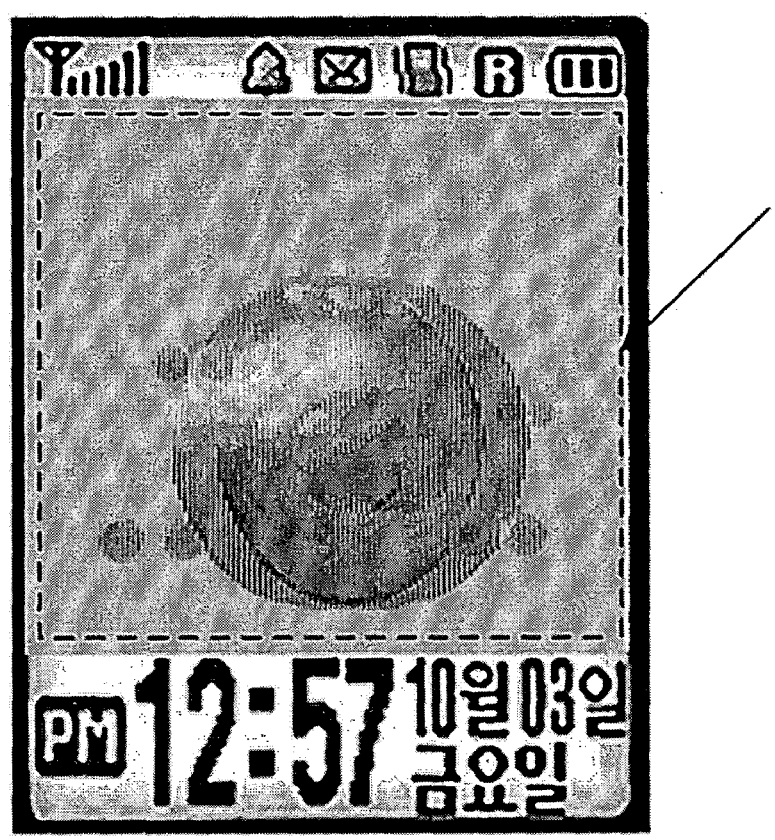
FIG. 5C illustrates a stereoscopic-image user interface on which a stereoscopic image display device stereoscopically displays an entire screen according to an exemplary embodiment of the present invention.

FIG. 5A illustrates a stereoscopic-image user interface on which a stereoscopic image display device stereoscopically displays a selected item in a menu according to an exemplary embodiment of the present invention. FIG. 5B illustrates a stereoscopic-image user interface on which a stereoscopic image display device stereoscopically displays selected icon and text items according to an exemplary embodiment of the present invention. FIG. 5C illustrates a stereoscopic-image user interface on which a stereoscopic image display device stereoscopically displays an entire screen according to an exemplary embodiment of the present invention. In FIGS. 5A to 5C, an arrow is used to indicate a stereoscopic image display area.

Now, a 2D image data processor for realizing a stereoscopic image user interface using 2D image data according to another exemplary embodiment of the present invention is described in more detail with reference to FIG. 6.

Figure 6:
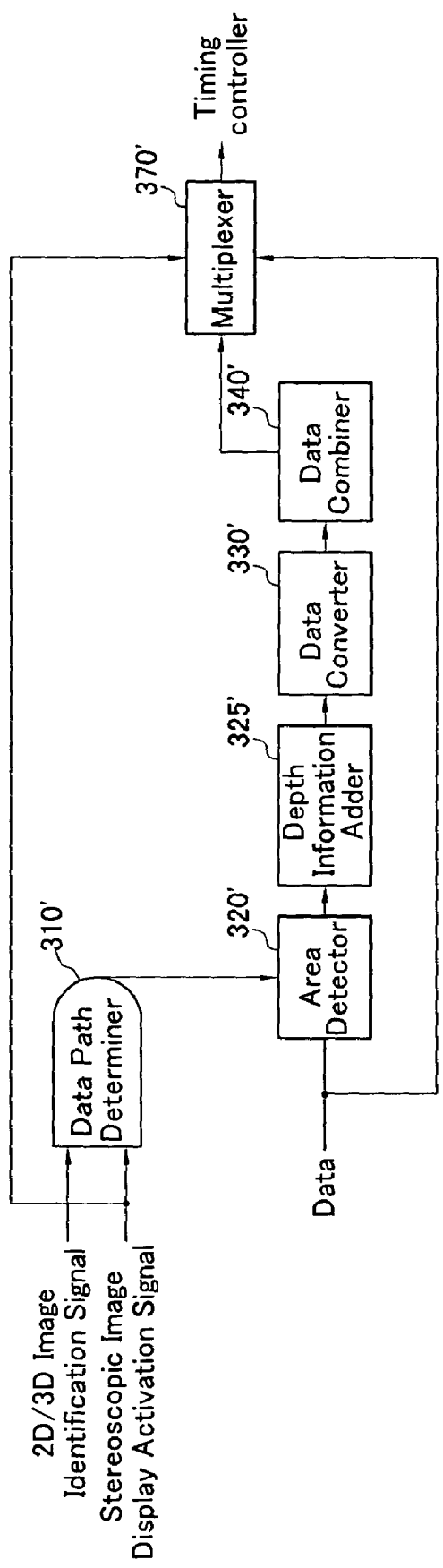
FIG. 6 illustrates a configuration of a data processor for a 2D image according to another exemplary embodiment of the present invention.

FIG. 6 illustrates a configuration of a data processor for a 2D image according to another exemplary embodiment of the present invention.

The 2D image data unit includes a data path determiner 310', an area detector 320', a depth information adder 325', a data converter 330', a data combiner 340', and a multiplexer 370'.

The data path determiner 310' receives stereoscopic display activation signal data, determines whether input data is 2D image data, and upon receiving 2D image data transmits the corresponding data to the area detector 320'. In more detail, the data path determiner 310' determines whether the input signal is 2D image data by using a 2D/3D image identification signal. The data path determiner 310' transmits the input data to the area detector 320' on receiving 2D image data. In FIG. 6, it should be understood that using the 2D/3D image identification signal to determine a type of data is provided as an example, and the present invention is not thereby limited. For example, the type of data may alternatively be determined by using the spatial information included in the data. The data path determiner 310' of FIG. 6 is substantially the same as the data path determiner 310 of FIG. 4 that has been previously described in detail. As such, the data path determiner 310' of FIG. 6 will not be described in detail for the convenience of description.

Among the input data, the area detector 320' detects data corresponding to the stereoscopic image display area (that is, data to be expressed in a stereoscopic image), and transmits the detected data to the depth information adder 325'. The method for detecting the data corresponding to the stereoscopic image display area has already been described in detail, and it will not be described in detail again.

The depth information adder 325' adds the respective depth information to the data corresponding to the stereoscopic image display area using a stored depth information map, which may have been predetermined. The depth information corresponds to the distance between a reference surface and an image viewed by the observer, when the reference surface is given as a screen of the display unit 100. In more detail, when the depth information includes 10 levels, the image is shown closest to the observer from the reference surface at the depth information of 10, farthest to the observer from the reference surface at the depth information of 0, and at the same level with the reference surface at the depth information of 5. The depth information may be defined in correspondence with the disparity. That is, the depth information of 10 may be set as the disparity of 5, the depth information of 5 may be set as the disparity of 0, and the depth information of 0 may be set as the disparity of −5. In addition, the pixel distance, by which the data is shifted so as to generate the right/left-eye data, may be respectively set in correspondence with this depth information. For example, the pixel shifting distance may be given as 8 pixels for the depth information of 10 and as 4 pixels for the depth information of 8.

The depth information map is determined by matching the respective depth information to a predetermined menu icon, etc., to be expressed in the user interface. In more detail, when the user interface is formed with the predetermined menu icon and background, the predetermined depth information is added to the respective menu icons and the background. For example, the depth information of 10, 8, and 5 may be respectively added to the first menu icon, the second menu icon, and the background. When the input data correspond to the first menu icon, the data converter shifts the data by 8 pixels in the right/left direction in correspondence with the depth information of 10 to form the right/left-eye data.

Such a setting method of the depth information map is not limited to the above described examples. Alternatively, for example, the largest depth information of 10 may be set at an interior of the menu icon, and the level of the depth information may become lowered therefrom so that the depth information of 7 is set at the icon boundary and the depth information of 5 is set at the background, for example.

The depth information map is set in correspondence with the user interface so that it is stored at the data converter 330'. When there are pluralities of user interfaces, the data converter 330' respectively stores the depth information map for the respective user interfaces. The depth information map, and the depth information for the menu icon and background, etc., therein, can be varied by the user. However, when the depth information adder 325' is used as shown in FIG. 6, the depth information adder 325' can more specifically express the stereoscopic image by adding the depth information to the data.

Although not shown in FIG. 6, an effect adder may also be included so as to provide additional effect information along with the depth information to the data, which correspond to the stereoscopic image display area transmitted from the area detector 320'. The additional effect information may include color information, blinking information, and sound information. When the color information is added along with the depth information, the selected menu icon may be expressed as a highlighted stereoscopic image by a predetermined color. When the blinking information is added along with the depth information, the selected menu icon may be expressed as a blinking stereoscopic image with a predetermined interval. When the sound information is added along with the depth information, the selected menu icon may be accompanied with a predetermined sound effect while being expressed as a stereoscopic image.

The data converter 330' converts the data, which correspond to the stereoscopic image display area detected by the area detector 320', to the right/left-eye data using the depth information transmitted from the depth information adder 325', and transmits the converted data to the data combiner 340'. The method for converting data is described in detail along with the description of the first data converter 330 of FIG. 4. Accordingly, such a method is not described in detail again.

The data combiner 340' combines the stereoscopic image data by obtaining the right/left-eye data from the data converter 330' and by arranging the obtained data depending on the arrangement of the right/left-eye pixels. The method for combining stereoscopic image data has already been described in detail along with the description of the data combiner 340 of FIG. 4. Accordingly, such a method is not described in detail again.

Now, a 3D image data processor for realizing a stereoscopic image user interface by 3D image data according to yet another exemplary embodiment of the present invention is described in more detail with reference to FIG. 7.

Figure 7:
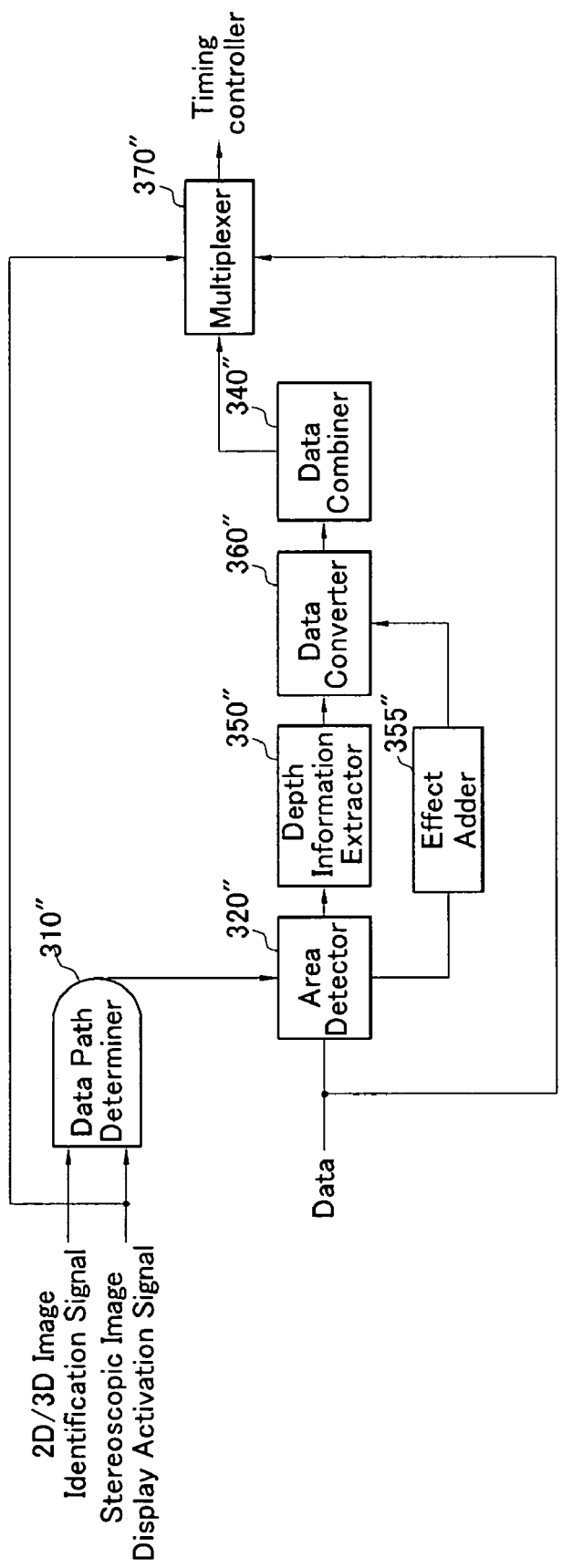
FIG. 7 illustrates a configuration of a data processor for a 3D image according to yet another exemplary embodiment of the present invention.

FIG. 7 illustrates a configuration of a data processor for a 3D image according to yet another exemplary embodiment of the present invention.

The stereoscopic image data processor includes a data path determiner 310", an area detector 320", a depth information extractor 350", an effect adder 355", a data converter 360", a data combiner 340", and a multiplexer 370".

In response to a stereoscopic display activation signal, the data path determiner 310" receives data, determines whether the input data is 3D image data, and upon receiving 3D image data, transmits the corresponding data to the area detector 320". In more detail, the data path determiner 310" determines whether the input signal is 3D image data by using 2D/3D image identification signals. The data path determiner 310" transmits the input data to the area detector 320" upon receiving 3D image data.

The area detector 320" detects the data to be expressed in a stereoscopic image display, and transmits the detected data to the depth information extractor 350". The method for detecting stereoscopic image data has been previously described in detail, and so is not described in further detail here.

The depth information extractor 350" calculates the respective depth information for the data using the spatial information included in the input 3D image data, and transmits the calculated depth information to the data converter 360". As shown in FIG. 7, the depth information extractor 350" calculates the respective space coordinates for the right/left eye data using the space coordinate information included in the 3D image data, and calculates the depth information from the calculated respective space coordinates.

In this embodiment, the depth information extractor 350" extracts the depth information from the corresponding spatial information for the data detected from the area detector 320", and then adds the stored depth information (which may have been predetermined) to the extracted depth information. In this case, the data detected by the area detector 320" have different depth information in comparison with data that are not detected thereby.

The effect adder 355" adds an effect (which may have been predetermined) to the detected data. Such predetermined effect may include color, blinking, or sound effect. When the corresponding effect is respectively the color effect, blinking effect, or sound effect, the effect adder 355" respectively adds predetermined color information, blinking information, or sound information to the data corresponding to the area detected from the area detector 320".

The data converter 360" receives the depth information from the depth information extractor 350" and the effect information from the effect adder 355". Then, the data converter 360" converts the data to the right/left-eye data by using the received depth information or the effect information, and transmits the converted data to the data combiner 340".

The data combiner 340" combines the stereoscopic image data by obtaining the right/left-eye data from the data converter 360" and by arranging the same depending on the arrangement of the right/left-eye pixels.

Figure 8:
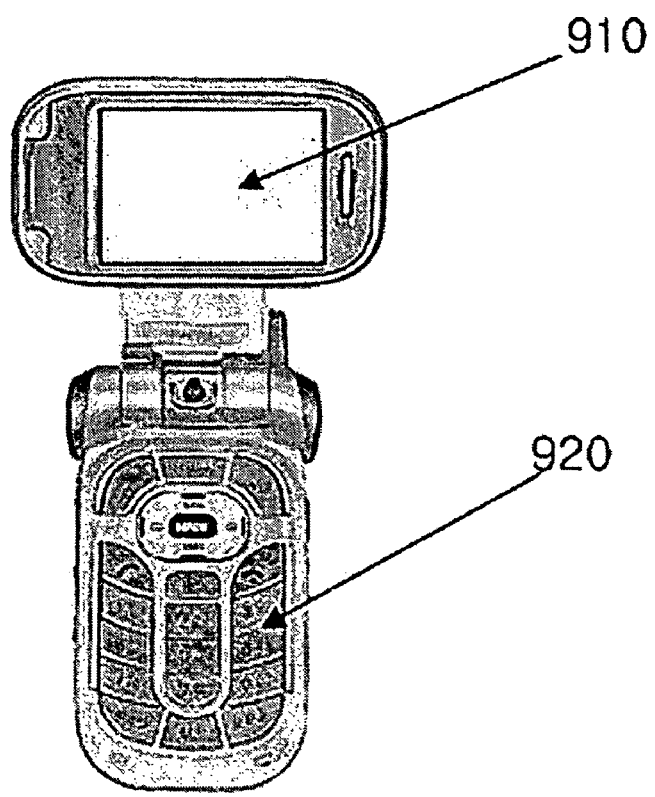
FIG. 8 illustrates a mobile communication terminal including a stereoscopic image display device according to an exemplary embodiment of the present invention.

Now, a mobile communication terminal including a stereoscopic image display device according to an exemplary embodiment of the present invention is described with reference to FIG. 8. FIG. 8 illustrates a mobile communication terminal including a stereoscopic image display device according to an exemplary embodiment of the present invention.

As shown in FIG. 8, the mobile communication terminal includes a display unit 910 and a main body 920.

The display unit 910 may include the display unit 100 and the barrier 100' of the stereoscopic image display device according to an exemplary embodiment of the present invention.

The main body 920 includes a keypad, a communication module, and a controller. The keypad is used to input user data, the controller is used to perceive and process the input data, and the communication module is used to perform a mobile communication. In this case, the controller may include the data processor 300, timing controller 800, etc., used in the stereoscopic image display device according to an exemplary embodiment of the present invention. As shown in FIG. 8, the mobile communication terminal converts the stored data or received data to a stereoscopic image, and displays the stereoscopic image on the display unit 910. The display unit 910 may display the user interface, particularly the user interface partially having a stereoscopic image thereon.

According to an exemplary embodiment of the present invention, the stereoscopic image display device can highlight and express at least a part of the user interface in a stereoscopic image by realizing the part of the user interface in a stereoscopic image. In more detail, in the 2D image user interface, the depth information is added for the selected menu icon so that the selected menu icon may be expressed in a stereoscopic image, or in the stereoscopic image user interface, the different depth information is added for the selected menu icon so that the selected menu icon may be highlighted in comparison with the other peripheral portion.

In addition, according to an exemplary embodiment of the present invention, by expressing the menu tree of the user interface in a stereoscopic image, the stereoscopic image display device enables the user to directly select the end menu without sequentially passing through the main menu and middle menu. Thus, the stereoscopic image display device can have an improved or more convenient user interface.

Now, a menu tree structure of a user interface according to an exemplary embodiment of the present invention is described with reference to FIG. 9 and FIG. 10.

Figure 9:
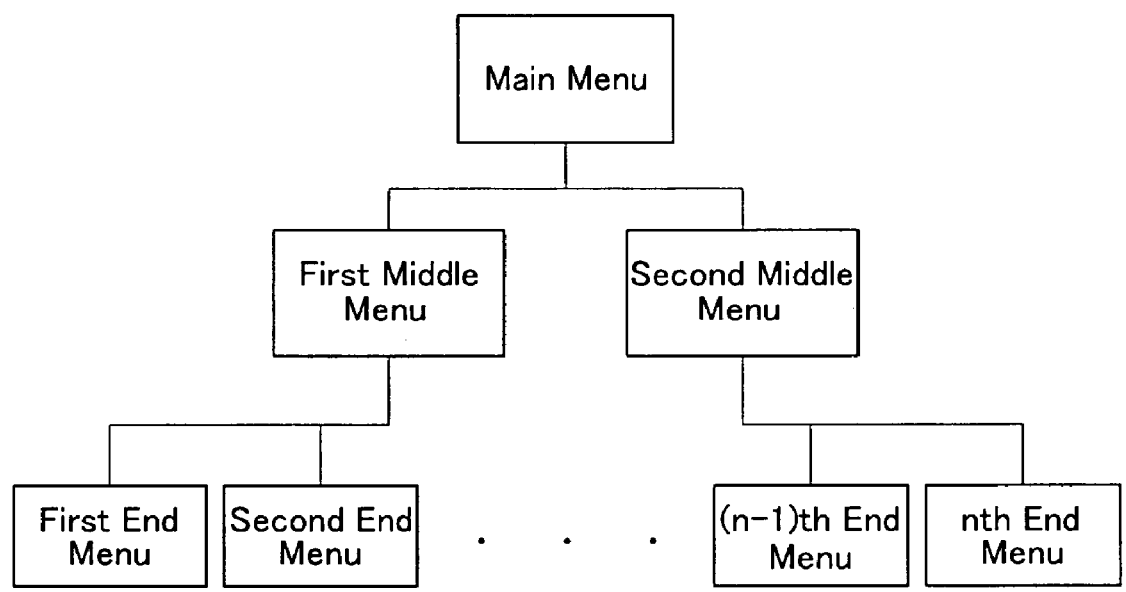
FIG. 9 illustrates a menu tree structure of a conventional user interface.

FIG. 9 illustrates a menu tree structure of a conventional user interface. FIG. 10 illustrates a menu tree structure of a user interface according to an exemplary embodiment of the present invention.

In the menu tree structure as shown in FIG. 9, in order to select an end menu item in a main menu item screen, the main menu item selection screen, intermediate menu item selection screen, and end menu item selection screen must be sequentially selected. In addition, in order to select a main menu item after the end menu item, the intermediate (or middle) menu item selection screen must be selected again and then the main menu item must be selected. However, in the menu tree structure according to an exemplary embodiment of the present invention as shown in FIG. 10, the end menu item can be directly selected without sequentially selecting the main and middle menu item selection screens, since the menu tree is expressed in a stereoscopic image. As shown in FIG. 10, high, middle, and low depth information are respectively applied to the main, middle, and end menu items.

Figure 10:
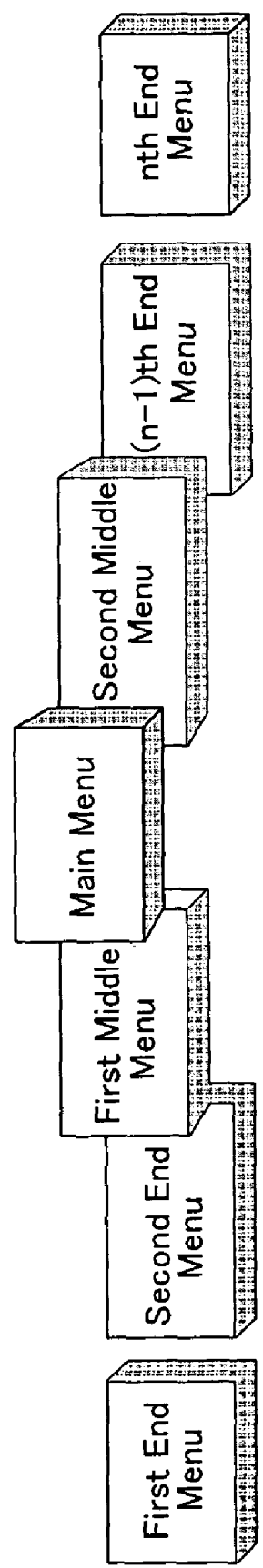
FIG. 10 illustrates a menu tree structure of a user interface according to an exemplary embodiment of the present invention.

The depth information applied in the user interface of FIG. 10 may be changed according to the predetermined conditions. For example, the user interface may be observed in the right side by rotating a camera viewpoint in the screen of FIG. 10. In this case, the n-th end menu may be placed closest to the user. Therefore, the depth information of the n-th end menu must be increased while the depth information of the main menu must be decreased. In this case, the user need not select the main menu so as to select the middle menu or the end menu. That is, the user can directly select the middle menu or the end menu by rotating the camera viewpoint. Therefore, according to an exemplary embodiment of the present invention, the stereoscopic image display device capable of realizing a stereoscopic image user interface can be designed to be more convenient for the user.

As described above, the stereoscopic image display device having a stereoscopic image user interface according to an exemplary embodiment of the present invention can express a part of the user interface in a stereoscopic image when the user interface has been realized in a 2D image. Therefore, the stereoscopic image display device according to an exemplary embodiment of the present invention can provide a more identifiable and convenient stereoscopic image user interface to the user by expressing a part of the user interface in a stereoscopic image. In addition, the stereoscopic image display device according to an exemplary embodiment of the present invention can express at least a part of the user interface in a stereoscopic image when the user interface data is 3D image data. In addition, the stereoscopic image display device according to an exemplary embodiment of the present invention can stereoscopically configure the menu tree structure so that the user can directly select the menu.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A stereoscopic image display device comprising:
   a display unit including a plurality of pixels arranged in a matrix for displaying a user interface, the pixels including right/left-eye pixels arranged in a row direction;
   a data path determiner for determining a data processing path of a plurality of input data in accordance with the input data and a stereoscopic display activation signal, the input data being one selected from the group consisting of 2D image data, 3D image data, and stereoscopic image data;
   an area detector for detecting first data representing at least a part of the pixels from the plurality of input data when the input data is 2D image data, the part of the pixels representing a part of the user interface to be expressed in a stereoscopic image, a part of the pixels corresponding to a remaining part of the user interface to be expressed as a 2D image;
   a data converter for converting the first data to right/left eye data corresponding to the right/left-eye pixels;
   a data combiner for combining stereoscopic image data by arranging the right/left-eye data; and
   a data driver for applying a data signal corresponding to the stereoscopic image data to the display unit.

2. The stereoscopic image display device of claim 1, wherein the data converter is configured to convert second data to the right/left-eye data by respectively right/left-shifting the second data in the row direction by first and second numbers of the pixels from a corresponding one of the pixels, and wherein the second data is at least a part of the first data.

3. The stereoscopic image display device of claim 1, further comprising a depth information adder for transmitting depth information corresponding to the first data to the data converter using a depth information map, wherein the depth information map comprises depth information respectively corresponding to the first data.

4. The stereoscopic image display device of claim 3, wherein the data converter is configured to convert second data to the right/left-eye data by respectively right/left-shifting the second data in the row direction by a first number of the pixels from a corresponding one of the pixels, the second data being at least a part of the first data,
   wherein the data converter is configured to convert third data to the right/left-eye data by respectively right/left-shifting the third data in the row direction by a second number of the pixels from the corresponding one of the pixels, the third data being at least another part of the first data, and
   wherein the first number or the second number is determined depending on the depth information respectively corresponding to the second data or the third data.

5. The stereoscopic image display device of claim 1, wherein an image expressed by the pixels forms the user interface.

6. The stereoscopic image display device of claim 5, wherein the first data is included in a selected area of the user interface.

7. The stereoscopic image display device of claim 5, wherein the area detector is configured to detect data corresponding to an area including a position where a user places a predetermined pointing mechanism in the user interface as the first data.

8. The stereoscopic image display device of claim 1, wherein the data combiner arranges the right/left-eye data depending on the arrangement of the plurality of right/left-eye pixels.

9. The stereoscopic image display device of claim 1, wherein the data combiner is configured to combine the right/left-eye data, converted from the first data, together with second data excluding the first data, and to transmit the combined data to the data driver, and wherein the combined data includes the stereoscopic image data.

10. The stereoscopic image display device of claim 1, further comprising a barrier having transparent regions and opaque regions arranged such that right/left-eye images are respectively transmitted from the right/left-eye pixels to a right-eye direction and a left-eye direction.

11. The stereoscopic image display device of claim 10, wherein the barrier is configured to convert the transparent regions or the opaque regions to be transparent or to be opaque by changing an arrangement thereof according to applied voltages.

12. The stereoscopic image display device of claim 2, wherein the first number, the second number, or depth information corresponding to the first data is varied by a user.

13. A stereoscopic image display device comprising:
   a display unit including a plurality of pixels arranged in a matrix for displaying a user interface, the pixels including right/left-eye pixels arranged in a row direction;
   a data path determiner for determining a data processing path of a plurality of input data in accordance with the input data and a stereoscopic display activation signal, the input data being one selected from the group consisting of 2D image data, 3D image data, and stereoscopic image data;
   an area detector for detecting first data representing at least a part of the pixels from the plurality of input data when the input data is 2D image data, the part of the pixels representing a part of the user interface to be expressed in a stereoscopic image, a part of the pixels corresponding to a remaining part of the user interface to be expressed as a 2D image;
   a depth information extractor for extracting depth information from the first data using 3D spatial information included in the first data;
   a data converter for converting the first data to right/left-eye data respectively corresponding to the right/left-eye pixels using the depth information;

a data combiner for combining stereoscopic image data by arranging the right/left-eye data; and a data driver for applying a data signal corresponding to the stereoscopic image data to the display unit.

14. The stereoscopic image display device of claim 13, wherein the data converter is configured to convert a part of the first data to the right/left-eye data by respectively right/left-shifting the part of the first data by first and second numbers of the pixels.

15. The stereoscopic image display device of claim 14, further comprising a depth information adder for adding the depth information, wherein the depth information determines the first number and the second number.

16. The stereoscopic image display device of claim 13, wherein an image to be expressed by the pixels forms the user interface.

17. The stereoscopic image display device of claim 16, wherein the first data correspond to areas which a user selects in the user interface.

18. The stereoscopic image display device of claim 16, further comprising a depth information adder, wherein, with respect to the first data detected by the area detector, the depth information adder is configured to add predetermined depth information to the extracted depth information.

19. The stereoscopic image display device of claim 13, wherein the data combiner is configured to arrange the right/left-eye data depending on the arrangement of the plurality of right/left-eye pixels.

20. The stereoscopic image display device of claim 13, further comprising a barrier having transparent regions and opaque regions arranged such that right/left-eye images are respectively transmitted from the right/left-eye pixels to a left-eye direction and a right eye direction.

21. The stereoscopic image display device of claim 20, wherein the barrier is configured to convert the transparent and opaque regions to be transparent or opaque by changing an arrangement thereof according to applied voltages.

22. A stereoscopic image display device comprising:
a display unit including a plurality of pixels arranged in a matrix for displaying a user interface, the pixels including right/left-eye pixels arranged in a row direction;
a data path determiner for determining a data processing path of a plurality of input data in accordance with the input data and a stereoscopic display activation signal, the input data being one selected from the group consisting of 2D image data, 3D image data, and stereoscopic image data;
an area detector for detecting first data representing at least a part of the pixels among the plurality of input data when the input data is 2D image data, the part of the pixels corresponding to representing a part of the user interface to be expressed in a stereoscopic image, a part of the pixels corresponding to a remaining part of the user interface to be expressed as a 2D image;
a first data converter for converting the first data to right/left-eye data respectively corresponding to the right/left-eye pixels when the first data is the 2D image data;
a second data converter for converting the first data to right/left-eye data respectively corresponding to the right/left-eye pixels using depth information when the first data is the 3D image data, the depth information being extracted with respect to the first data using 3D spatial information included in the first data;
a stereoscopic image combiner for combining stereoscopic image data by arranging the right/left-eye data generated from the first data converter or the second data converter; and a data driver for applying a data signal corresponding to the stereoscopic image data to the display unit.

23. The stereoscopic image display device of claim 22, further comprising a depth information adder for transmitting the depth information respectively corresponding to the first data to the data converter using a depth information map, wherein the depth information map includes the depth information respectively corresponding to the first data.

24. The stereoscopic image display device of claim 22, wherein:
the first data converter is configured to convert second data to the right/left-eye data by respectively right/left-shifting the second data in the row direction by a first number of the pixels from a corresponding one of the pixels, the second data being at least a part of the first data,
the first data converter is configured to convert third data to the right/left-eye data by respectively right/left-shifting the third data in the row direction by a second number of the pixels from the corresponding one of the pixels, the third data being at least another part of the first data, and
wherein the first number or the second number is determined depending on the depth information respectively corresponding to the second data or the third data.

25. The stereoscopic image display device of claim 23, wherein the depth information adder adds predetermined depth information to the depth information extracted from the first data detected by the area detector.

26. The stereoscopic image display device of claim 22, wherein an image to be expressed by the pixels forms the user interface.

27. The stereoscopic image display device of claim 26, wherein the first data correspond to areas which a user selects in the user interface.

28. The stereoscopic image display device of claim 26, wherein the stereoscopic image combiner arranges the right/left-eye data depending on the arrangement of the plurality of right/left-eye pixels.

29. A communication terminal comprising:
a wired or wireless communication device; and
a stereoscopic image display device comprising a display unit for realizing a user interface including at least a part of a stereoscopic image and for displaying data received through the wired or wireless communication device or stored data on the display unit,
wherein the display unit comprising:
a data path determiner for determining a data processing path of a plurality of input data in accordance with an image type of the input data and a stereoscopic display activation signal, the image type being one selected from the group consisting of a 2D image, a 3D image, and a stereoscopic image;
a plurality of pixels arranged in a matrix, the pixels including right/left-eye pixels arranged in a row direction;
an area detector for detecting first data representing at least a part of the pixels among the plurality of input data when the input data is 2D image data, the part of the pixels representing a part of the user interface to be expressed in the stereoscopic image, a part of the pixels corresponding to a remaining part of the user interface to be expressed as a 2D image;
a data converter for converting the first data to right/left-eye data corresponding to the right/left-eye pixels;
a data combiner for generating stereoscopic image data by arranging the right/left-eye data; and
a data driver for applying a data signal to the display unit corresponding to the stereoscopic image data.

30. The communication terminal of claim 29, wherein predetermined data is converted and displayed in a stereoscopic image in response to the stereoscopic display activation signal.

31. The communication terminal of claim 30, wherein the stereoscopic display activation signal is generated when an input signal or the communication terminal satisfies predetermined conditions.

32. The communication terminal of claim 31, wherein the predetermined conditions include a condition in which the communication terminal receives a phone call or an SMS signal from another wired or wireless communication device.

* * * * *

UNITED STATES PATENT AND TRADEMARK OFFICE
CERTIFICATE OF CORRECTION

PATENT NO. : 8,111,906 B2
APPLICATION NO. : 11/480017
DATED : February 7, 2012
INVENTOR(S) : Myoung-Seop Song et al.

Page 1 of 1

It is certified that error appears in the above-identified patent and that said Letters Patent is hereby corrected as shown below:

In the Claims

Column 15, Claim 22, line 51    Delete "corresponding to"

Signed and Sealed this
First Day of October, 2013

Teresa Stanek Rea
*Deputy Director of the United States Patent and Trademark Office*